United States Patent [19]

Inoue et al.

[11] Patent Number: 5,722,588
[45] Date of Patent: Mar. 3, 1998

[54] COMBUSTION HEATER

[75] Inventors: Takashi Inoue; Masanori Yasuda, both of Okazaki; Sadahisa Onimaru, Chiryu; Hiroshi Okada, Kariya; Akikazu Kojima, Gamagori; Niro Takaki, Kariya, all of Japan

[73] Assignee: Nippon Soken Inc., Nishio, Japan

[21] Appl. No.: 422,522

[22] Filed: Apr. 13, 1995

[30] Foreign Application Priority Data

Apr. 13, 1994  [JP]  Japan ................... 6-100744
Sep. 5, 1994   [JP]  Japan ................... 6-236014

[51] Int. Cl.⁶ ........................................ B60H 1/02
[52] U.S. Cl. .................. 237/12.3 C; 431/37; 431/90; 431/262
[58] Field of Search ............... 431/37, 90, 202, 431/262; 237/12.3 C

[56] References Cited

U.S. PATENT DOCUMENTS

| | | | |
|---|---|---|---|
| 3,072,176 | 1/1963 | Sunday | 237/12.3 C |
| 3,133,527 | 5/1964 | Mizer | 237/12.3 C |
| 4,538,985 | 9/1985 | Zwicker . | |
| 4,798,531 | 1/1989 | Breckner | 431/90 |
| 5,020,991 | 6/1991 | Schaale et al. | 431/262 |
| 5,056,501 | 10/1991 | Ida | 431/262 |
| 5,088,918 | 2/1992 | Schaale et al. . | |
| 5,106,294 | 4/1992 | Profos | 431/90 |
| 5,401,162 | 3/1995 | Bonne | 431/90 |

FOREIGN PATENT DOCUMENTS

| | | | |
|---|---|---|---|
| 3025283 | 2/1982 | Germany | 237/12.3 C |
| 60-29505 | 2/1985 | Japan . | |
| 188217 | 8/1986 | Japan | 237/12.3 C |
| 1262214 | 10/1989 | Japan . | |
| 282007 | 3/1990 | Japan . | |
| 473503 | 3/1992 | Japan . | |
| 4214105 | 8/1992 | Japan . | |

*Primary Examiner*—Carroll B. Dority
*Attorney, Agent, or Firm*—Cushman, Darby & Cushman IP Group of Pillsbury, Madison & Sutro LLP

[57] ABSTRACT

In a combustion heater, a fuel feed unit supplies a fuel uniformly into a burner so as to prevent incomplete combustion in the burner. When a vaporization member is provided in the burner, the fuel feed unit supplies the fuel uniformly all over the surface of the vaporization member so that the incomplete combustion in the burner is also prevented. In addition or alternatively, the fuel feed unit includes a fuel feed pipe and a valve unit which is provided at a tip portion of the fuel feed pipe, so as to prevent emissions of an unburned fuel. In addition or alternatively, a temperature of the fuel supplied to the burner is monitored, and an operation of the fuel feed unit or an air feed unit for supplying combustion air to the burner is controlled based on the monitored fuel temperature so as to provide a desirable air-fuel mixture for preventing incomplete combustion in the burner. An amount of the fuel supplied to the burner or an oxygen concentration in an exhaust gas after combustion in the burner may be monitored instead of the fuel temperature.

5 Claims, 19 Drawing Sheets

COMBUSTION HEATER

BACKGROUND OF THE INVENTION

1. Field of the Invention

The present invention relates to a combustion heater, and more specifically, to the combustion heater which aims to prevent incomplete combustion and so forth for improving emissions in the exhaust gas, such as, HC emissions and evaporative emissions.

2. Description of the Prior Art

As is known in the art, the combustion heater is arranged to burn up a portion of an engine fuel with a burner for heating water to be conducted to a radiator in a vehicular compartment. The combustion heater is used as an auxiliary vehicle heater before a temperature of engine cooling water increases to a given high value.

In the burner of the combustion heater, the supplied fuel is vaporized and mixed with combustion air, and this mixture is ignited and burned using a heater or a glow plug.

FIG. 25 shows one example of the conventional combustion heaters. In the figure, a housing 1 has a double-wall structure at its half to form a fluid passage 13 for water to be conducted to a radiator (not shown). A burner 2 is arranged in the housing 1. The burner 2 has a burner tube which is provided with a vaporization plate 4 at one axial end thereof. The vaporization plate 4 is prepared by forming ceramic fibers into a plate shape. An open end of a fuel feed pipe 73 is in abutment with the vaporization plate 4. Fuel is fed to the fuel feed pipe 73 from a pump 72 in a fuel tank 71 via a fuel cutoff valve 76. The fuel then reaches the vaporization plate 4 where the fuel is dispersed over the entirety of the vaporization plate 4 due to the capillary action. The vaporization plate 4 is heated by a glow plug 9 provided adjacent thereto. Accordingly, the fuel is vaporized from the vaporization plate 4 and then mixed with combustion air introduced into the burner tube via air introducing holes 211 so as to be ignited to burn.

The combustion heater using such a vaporization plate is disclosed in, such as, Japanese First (unexamined) Patent Publication No. 1-262214, Japanese First (unexamined) Patent Publication No. 4-73503, Japanese First (unexamined) Patent Publication No. 4-214105 equivalent to U.S. Pat. No. 5,088,918, or U.S. Pat. No. 4,538,985.

However, in the foregoing conventional combustion heaters, a fuel density is the highest at the contacting portion between the fuel feed pipe 73 and the vaporization plate 4 and is lowered toward peripheral areas thereof. Accordingly, a distribution of the fuel dispersed over the vaporization plate 4 does not become uniform. Further, the fuel dispersed in such a non-uniform manner is ignited by the glow plug 9 which has a relatively small heating range. Accordingly, at the start of combustion, incomplete combustion is caused at a portion where the fuel density is high, so as to increase an amount of HC emissions.

Further, at the time of extinction of flame when the fuel supply is stopped, the fuel remaining in a fuel passage from the fuel cutoff valve 76 to the open end of the fuel feed pipe 73 is gradually dispersed to the vaporization plate 4 and then vaporized. As a result, the unburned fuel is exhausted to cause a problem of the evaporative emissions.

Further, the fuel fed to the fuel feed pipe 73 is gradually increased in temperature due to the ongoing operation of the pump 72 and thus reduced in viscosity. This lowers flow resistance of the fuel passage against the fuel to increase a supply amount of the fuel to a value greater than a given initial value. As a result, the mixture of the fuel and the combustion air becomes richer to deteriorate the emissions in the exhaust gas.

For further prior art information, Japanese First (unexamined) Patent Publication No. 60-29505 shows a catalytic heater in which fuel is atomized using an ultrasonic vibrator, and Japanese First (unexamined) Patent Publication No. 2-82007 shows a vaporization oil burner in which a temperature sensor is provided in a fuel vaporizer so as to prevent generation of odor by closing a fuel nozzle until a temperature in the fuel vaporizer is lowered to a given value.

SUMMARY OF THE INVENTION

In view of the foregoing, it is an object of the present invention to provide an improved combustion heater which aims to solve one or more of the aforementioned drawbacks of the conventional combustion heaters.

According to one aspect of the present invention, a combustion heater having a burner in a housing provided with a fluid passage for heating a fluid introduced in the fluid passage comprises a vaporization member provided in the burner for vaporizing a fuel supplied to the burner; fuel feed means for supplying the fuel uniformly essentially all over the surface of the vaporization member; air feed means for supplying combustion air to the burner depending on an amount of the fuel supplied by the fuel feed means; and ignition means for igniting the supplied fuel in the burner.

According to another aspect of the present invention, a combustion heater having a burner in a housing provided with a fluid passage for heating a fluid introduced in the fluid passage comprises a fuel feed pipe for supplying a fuel to the burner; air feed means for supplying combustion air to the burner depending on a supply amount of the fuel; ignition means for igniting the supplied fuel in the burner; and a valve unit provided at a tip portion of the fuel feed pipe for opening/closing the fuel feed pipe.

According to another aspect of the present invention, a combustion heater having a burner in a housing provided with a fluid passage for heating a fluid introduced in the fluid passage comprises temperature detecting means for detecting a temperature of a fuel supplied to the burner; fuel adjusting means for adjusting an amount of the fuel supplied to the burner; air adjusting means for adjusting an amount of air supplied to the burner; and adjusting amount setting means for variably setting an adjusting amount of at least one of the fuel adjusting means and the air adjusting means based on the detected fuel temperature.

According to another aspect of the present invention, a combustion heater having a burner in a housing provided with a fluid passage for heating a fluid introduced in the fluid passage comprises fuel supply amount detecting means for detecting an amount of a fuel supplied to the burner; air adjusting means for adjusting an amount of air supplied to the burner; and adjusting amount setting means for variably setting an adjusting amount of the air adjusting means based on the detected fuel supply amount.

According to another aspect of the present invention, a combustion heater having a burner in a housing provided with a fluid passage for heating a fluid introduced in the fluid passage comprises oxygen concentration detecting means for detecting an oxygen concentration in an exhaust gas after combustion in the burner; fuel adjusting means for adjusting an amount of a fuel supplied to the burner; air adjusting means for adjusting an amount of air supplied to the burner; and adjusting amount setting means for variably setting an adjusting amount of at least one of the fuel adjusting means and the air adjusting means based on the detected oxygen concentration.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described hereinbelow with reference to the accompanying drawings.

Figure 1:
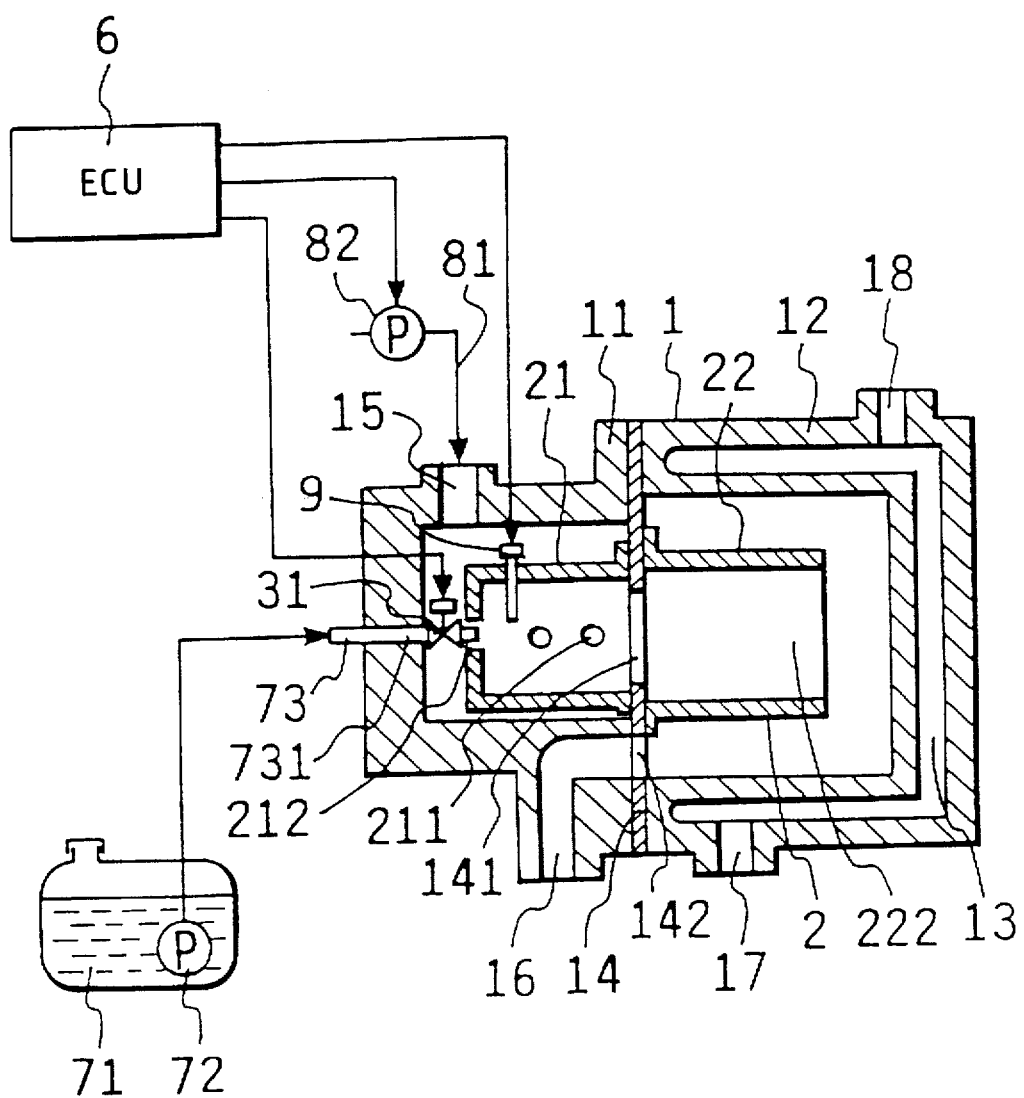
FIG. 1 is a sectional view showing the overall structure of a combustion heater according to a first preferred embodiment of the present invention.

FIG. 1 is a sectional view showing a combustion heater according to a first preferred embodiment of the present invention. In FIG. 1, the same or like elements are designated by the same reference numerals as those in FIG. 25.

In FIG. 1, a housing 1 of the combustion heater includes a pair of housing halves 11 and 12 which are fixed to each other at their open ends with a partition plate 14 interposed therebetween. The housing half 11 has an upper wall formed with an air inlet 15 and a lower wall formed with an exhaust-gas outlet 16. The housing half 12 has a double-wall structure to form a fluid passage 13. The fluid passage 13 communicates with a water inlet 17 formed at a lower wall of the housing half 12 and with a water outlet 18 formed at an upper wall of the housing half 12 for conducting water, as a heat transfer medium, to a radiator (not shown) provided in a vehicular compartment.

In the housing 1, a burner 2 is fixedly disposed at the center thereof. The burner 2 has a burner tube which is composed of a mixture tube 21 and a combustion tube 22 projecting from opposite sides of the partition plate 14, respectively. The combustion tube 22 is a cylindrical body having a relatively large diameter as compared with the mixture tube 21 which is also a cylindrical body. The combustion tube 22 is located in an interior space of the housing half 12 which communicates with the exhaust-gas outlet 16 via a through hole 142 formed at the partition plate 14. The mixture tube 21 is located in an interior space of the housing half 11 which communicates with the air inlet 15. The mixture tube 21 is formed with a small hole 212 at its axial end remote from the partition plate 14. The interior of the mixture tube 21 communicates with the interior of the combustion tube 22 via an opening 141 formed at the center of the partition plate 14.

A fuel feed pipe 73 is arranged to penetrate an axial end wall of the housing half 11 remote from the partition plate 14. A tip of the fuel feed pipe 73 passes through the small hole 212 of the mixture tube 21 and is exposed to the interior of the mixture tube 21. A fuel cutoff valve 31 is provided at a portion 731 of the fuel feed pipe 73 close to the tip thereof and between the foregoing axial end walls of the housing half 11 and the mixture tube 21 for adjusting a supply amount of the fuel by opening/closing the fuel feed pipe 73. The fuel cutoff valve 31 is in the form of an electromagnetic valve or a check valve. The fuel feed pipe 73 extends to reach a pump 72 provided in a fuel tank 71. Further, a number of air introducing holes 211 are formed at the circumferential wall of the mixture tube 21.

A glow plug 9 extends through the circumferential wall of the mixture tube 21 to reach the neighborhood of the tip of the fuel feed pipe 73. The glow plug 9 is of the known type which has been used in the automotive engine.

An electronic control unit (ECU) 6 is provided for opening/closing the fuel cutoff valve 31 and for energizing the glow plug 9. The ECU 6 further controls an operation of an air pump 82 provided at an air feed pipe 81 extending to reach the air inlet 15.

An operation of the combustion heater having the foregoing structure will be described hereinbelow.

At the time of ignition, the glow plug 9 is energized so as to increase a surface temperature thereof to an ignitable temperature of the fuel. Subsequently, the fuel cutoff valve 31 is opened to feed the fuel into the mixture tube 21, and the air pump 82 is driven to introduce combustion air into the mixture tube 21 via the air introducing holes 211. As a result, the fuel is vaporized near the surface of the glow plug 9 and then mixed with the combustion air so as to start combustion. Flame is ejected through an opening 222 of the combustion tube 22. The water flowing in the fluid passage 13 is heated by the flame and fed to the radiator so as to perform heating in the vehicular compartment. Burned gas as a result of the combustion is discharged through the exhaust-gas outlet 16.

On the other hand, at the time of extinction of flame, the fuel cutoff valve 31 is closed. However, since the fuel cutoff valve 31 is provided close to the tip of the fuel feed pipe 73 in this preferred embodiment, the evaporative emissions, that is, the emissions of the unburned fuel caused by vaporization of the fuel remaining in the fuel feed pipe 73, are effectively prevented as opposed to the aforementioned prior art.

Now, a second preferred embodiment of the present invention will be described hereinbelow.

Figure 2:
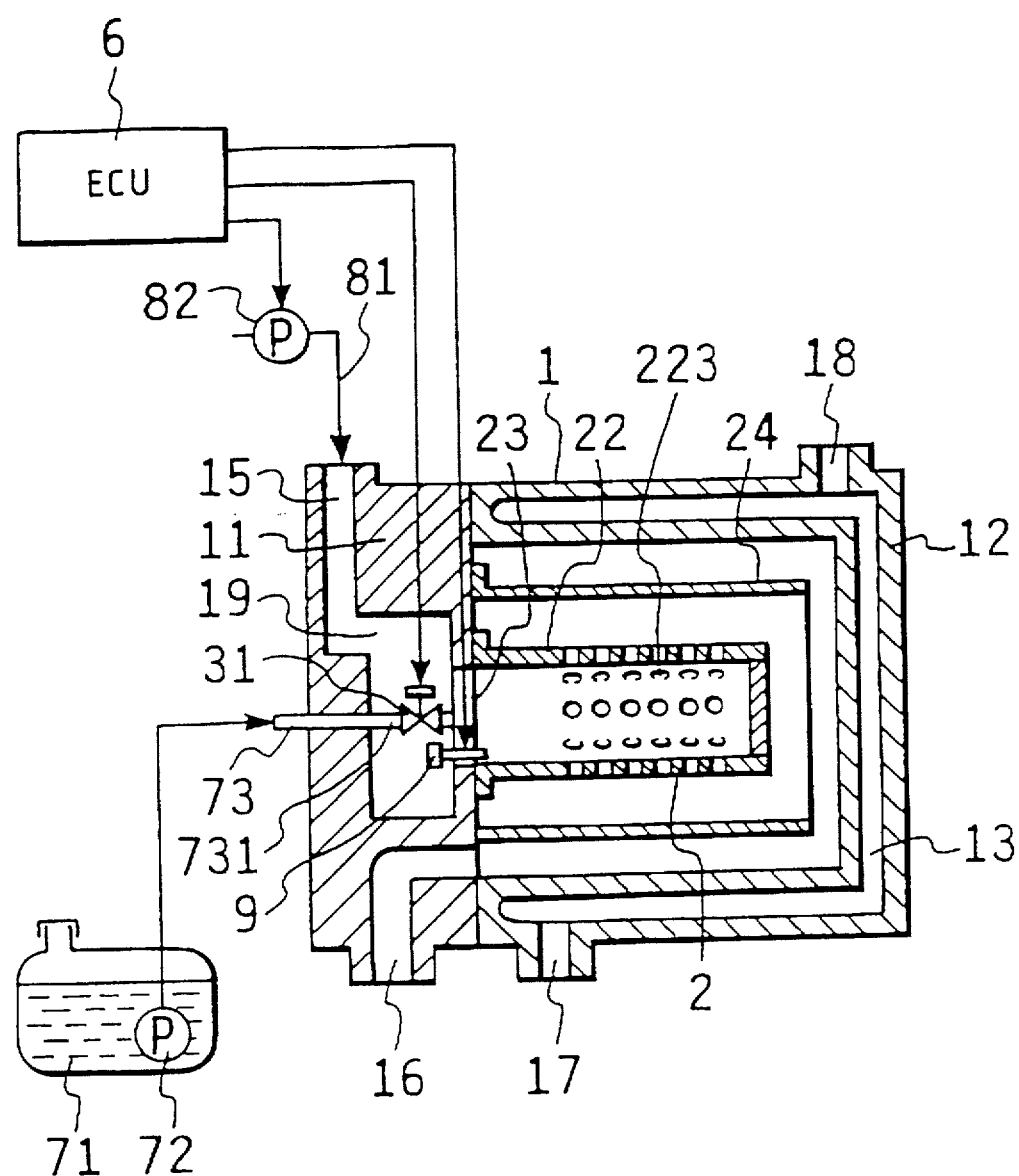
FIG. 2 is a sectional view showing the overall structure of a combustion heater according to a second preferred embodiment of the present invention.

FIG. 2 is a sectional view showing a combustion heater according to the second preferred embodiment, wherein the same or like elements are designated by the same reference numerals as those in FIG. 1.

As appreciated from FIG. 2, the fuel supply structure of the foregoing first preferred embodiment can also be applied to the combustion heater of a type shown in FIG. 2. Specifically, in the figure, a burner 2 is surrounded by a guide tube 24 having a larger diameter. A combustion tube 22 is closed at its axial end remote from a fuel feed pipe 73. A number of flame ejecting holes 223 are formed at a circumferential wall of the combustion tube 22. An open end 23 of the combustion tube 22 close to the fuel feed pipe 73 is fixed to an axial end wall of a housing half 11. In the housing half 11 is formed an air flow passage 19 which extends from an air inlet 15 to reach the open end 23 of the combustion tube 22.

Flame is ejected outward through, the flame ejecting holes 223 and then guided by the guide tube 24 toward a wall of a housing 1 where a fluid passage 13 is provided.

As appreciated from the foregoing description, the foregoing advantage achieved in the first preferred embodiment can also be achieved in this preferred embodiment.

Now, a third preferred embodiment of the present invention will be described hereinbelow.

Figure 3:
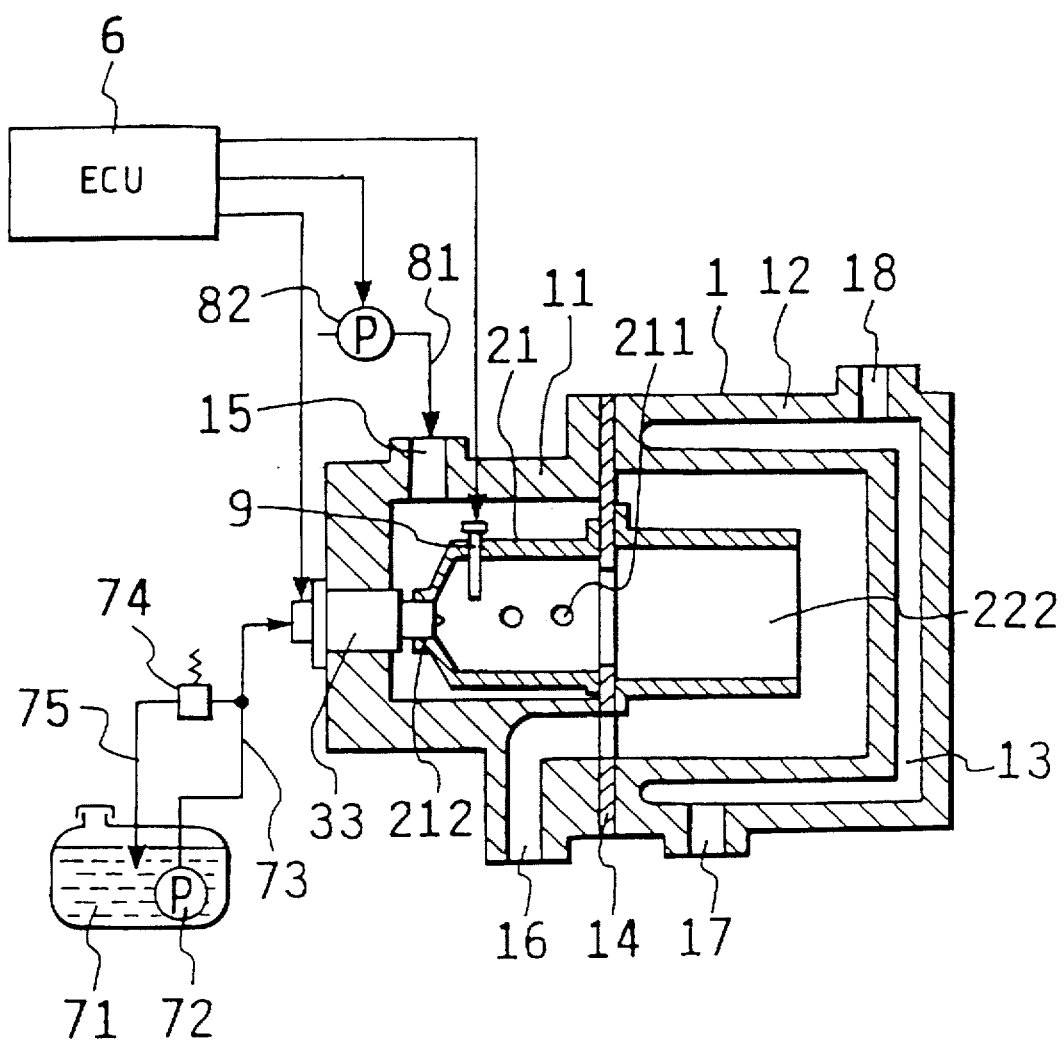
FIG. 3 is a sectional view showing the overall structure of a combustion heater according to a third preferred embodiment of the present invention.

FIG. 3 is a sectional view showing a combustion heater according to the third preferred embodiment, wherein the same or like elements are designated by the same reference numerals as those in FIG. 1.

As shown in FIG. 3, in this preferred embodiment, a known electromagnetic fuel injection valve 33 installed in the automotive engine is used instead of the fuel cutoff valve 31 of the first preferred embodiment shown in FIG. 1. Specifically, the fuel injection valve 33 is arranged to penetrate an axial end wall of a housing half 11 remote from a partition plate 14. Further, a tip of the fuel injection valve 33 is mounted in a small hole 212 of a mixture tube 21 and exposed to the interior of the mixture tube 21. A fuel inject/on pressure of the fuel injection valve 33 is about 3 kg/cm$^2$.

The fuel injection valve 33 is connected with a tip of a fuel feed pipe 73 extending from a pump 72 provided in a fuel tank 71 so as to be supplied with the fuel therefrom. A return pipe 75 provided with a relief valve 74 is connected to the fuel feed pipe 73 at an appropriate portion thereof from the pump 72 to the fuel injection valve 33 for returning an excess fuel to the fuel tank 71.

In the combustion heater having the foregoing structure, the fuel injection valve 33 works to spray the fuel uniformly into the mixture tube 21. Accordingly, at the time of ignition, HC emissions are effectively suppressed by preventing the incomplete combustion which would be otherwise caused at the portion where the fuel density is high as in the aforementioned prior art.

The fuel injection valve 33 further works to adjust a supply amount of the fuel by opening/closing the fuel feed pipe 73 at the tip of the fuel feed pipe 73. Accordingly, at the time of extinction of flame, the problem of emissions of the unburned fuel remaining in the fuel feed pipe 73 is also solved.

As appreciated, since the fuel injection valve 33 can cut the fuel supply by closing the fuel feed pipe 73, it is not necessary to provide the fuel cutoff valve separately.

Now, a fourth preferred embodiment of the present invention will be described hereinbelow.

Figure 4:
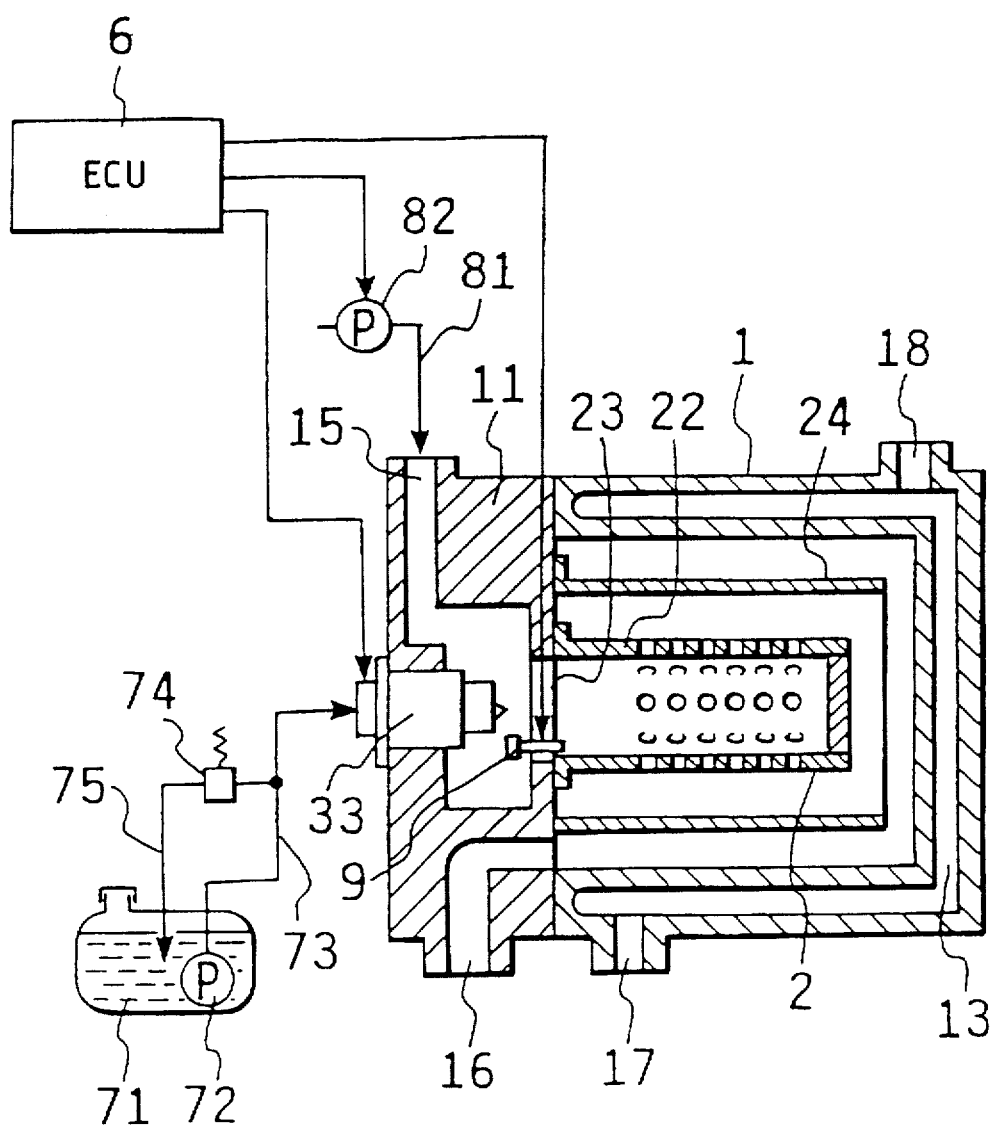
FIG. 4 is a sectional view showing the overall structure of a combustion heater according to a fourth preferred embodiment of the present invention.

FIG. 4 is a sectional view showing a combustion heater according to the fourth preferred embodiment, wherein the same or like elements are designated by the same reference numerals as those in FIG. 2.

As shown in FIG. 4, in this preferred embodiment, a fuel injection valve 33 which is the same as that used in the third preferred embodiment is used instead of the fuel cutoff valve 31 of the second preferred embodiment shown in FIG. 2. The fuel injection valve 33 is provided at a tip of a fuel feed pipe 73 as in the third preferred embodiment.

As appreciated, the foregoing advantage achieved in the third preferred embodiment can also be achieved in this preferred embodiment.

Now, a fifth preferred embodiment of the present invention will be described hereinbelow.

Figure 5:
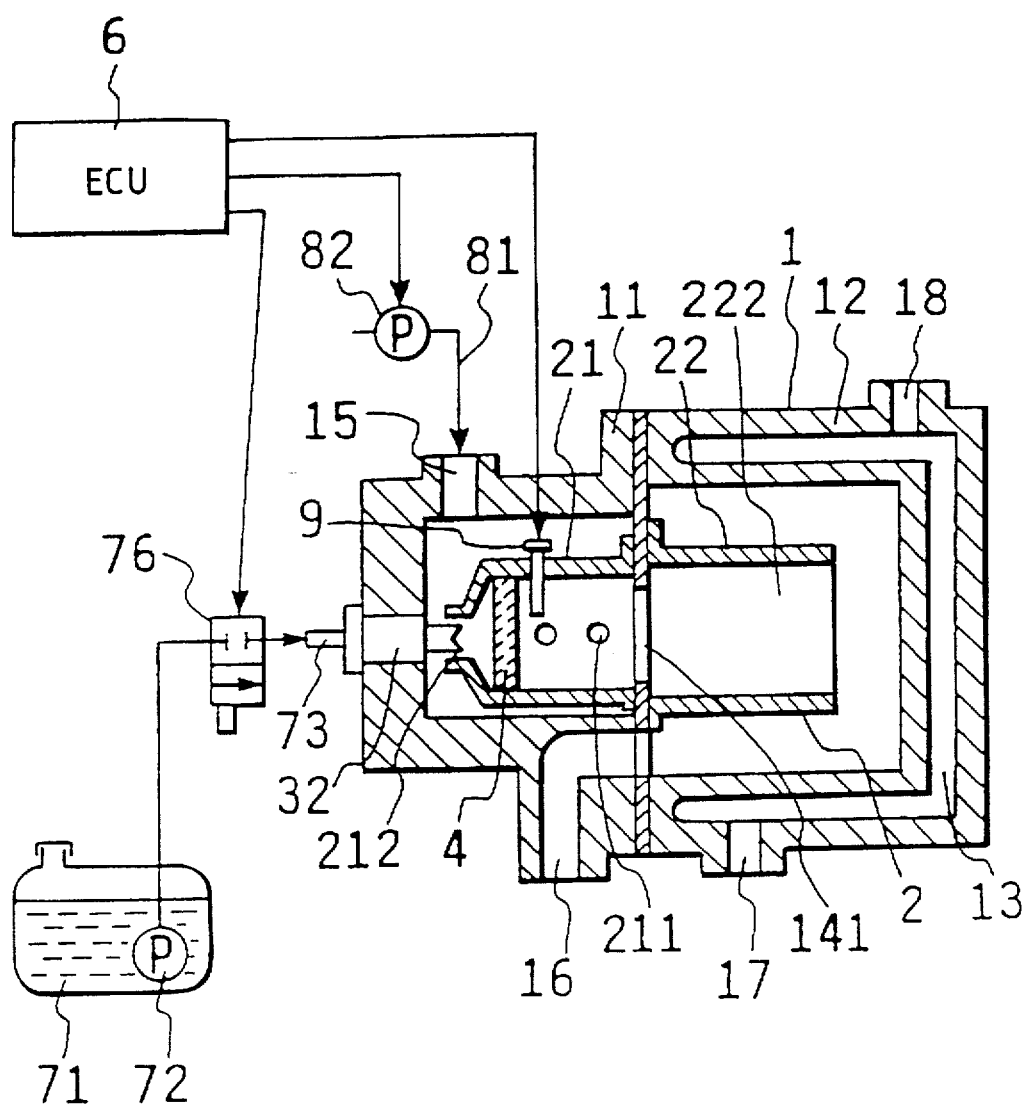
FIG. 5 is a sectional view showing the overall structure of a combustion heater according to a fifth preferred embodiment of the present invention.
Figure 15:
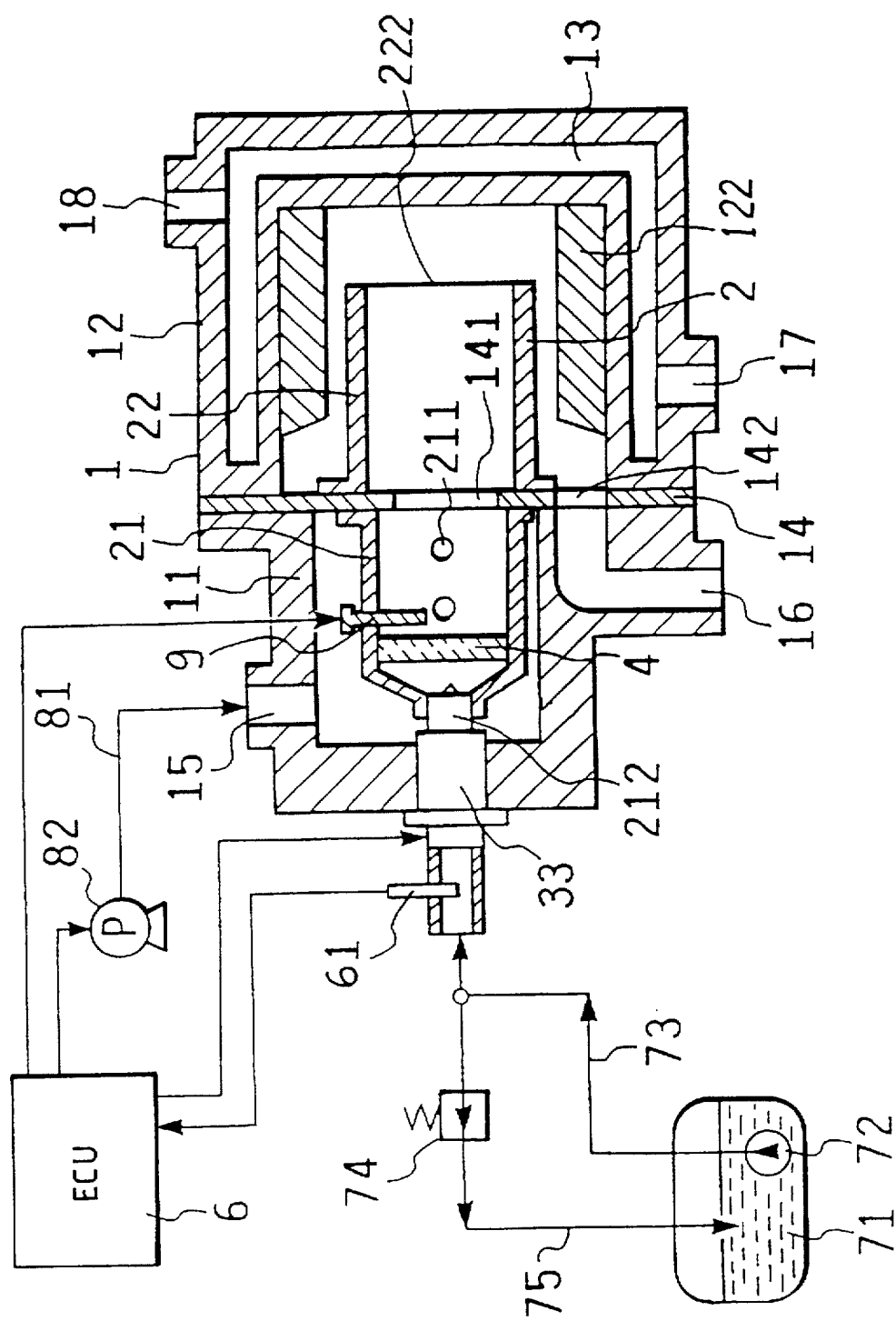
FIG. 15 is a sectional view showing the overall structure of a combustion heater according to a thirteenth preferred embodiment of the present invention.

FIG. 5 is a sectional view showing a combustion heater according to the fifth preferred embodiment, wherein the same or like elements are designated by the same reference numerals as those in FIGS. 1 and 15.

In FIG. 5, a spray nozzle 32 is arranged to penetrate an axial end wall of a housing half 11. The spray nozzle 32 is connected with a tip of a fuel feed pipe 73 extending from a pump 72 provided in a fuel tank 71. A tip of the spray nozzle 32 is located in a small hole 212 of a mixture tube 21. The spray nozzle 32 is capable of spraying the fuel in a wide range.

In the mixture tube 21, a vaporization plate 4 in the form of a porous disk body made of, such as, foam metal is disposed forward of the spray nozzle 32. In this preferred embodiment, the foam metal is nickel foam metal formed of pure nickel, nickel chrome or the like. The vaporization plate 4 is arranged to confront the tip of the spray nozzle 32 and cross laterally the inside of the mixture tube 21.

In the combustion heater having the foregoing structure, at the time of ignition, the fuel is sprayed all over the surface of the vaporization plate 4 from the spray nozzle 32 and then vaporized. The vaporized fuel is mixed with the combustion air in the neighborhood of a surface of a glow plug 9 and ignited to burn. Since the fuel is supplied uniformly all over the surface of the vaporization plate 4 by the spray nozzle 32, a distribution of the fuel on the vaporization plate 4 becomes uniform. This effectively solves the problem of HC emissions caused by the incomplete combustion at the portion of the vaporization plate 4 where the fuel density is high.

Now, a sixth preferred embodiment of the present invention will be described hereinbelow.

Figure 6:
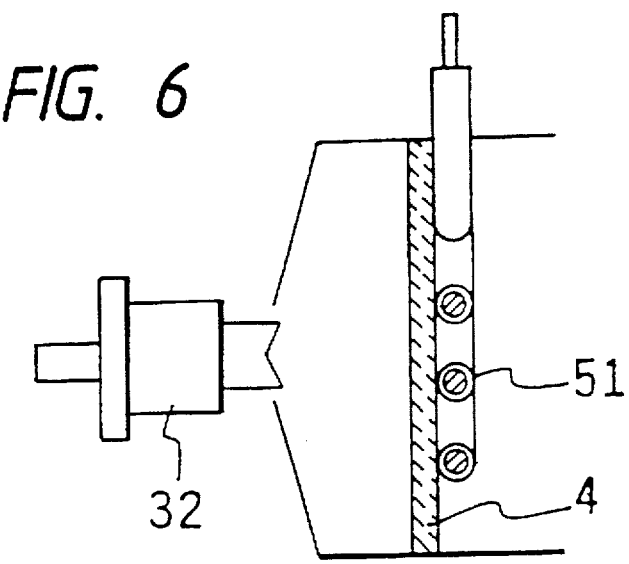
FIG. 6 is a partly-sectioned diagram for showing a state where a heating element is mounted onto a vaporization plate, according to a sixth preferred embodiment of the present invention.
Figure 7:
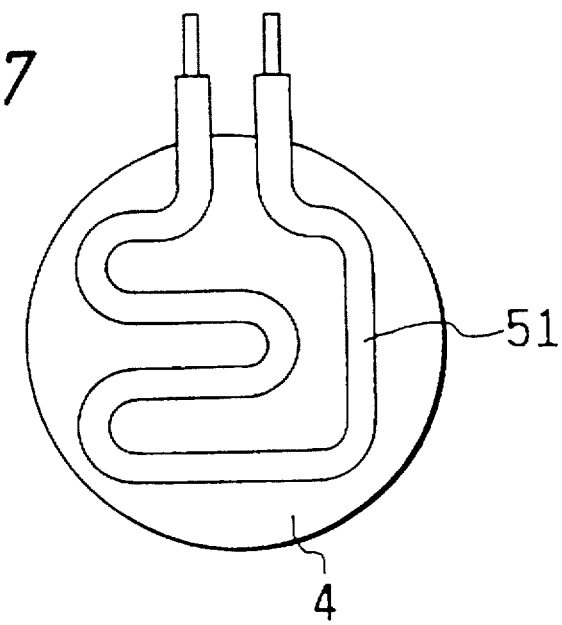
FIG. 7 is a diagram seen from one side of the vaporization plate remote from a spray nozzle for showing the foregoing state of FIG. 6.

As shown in FIGS. 6 and 7, in this preferred embodiment, a heater element 51 is arranged on a side, remote from the spray nozzle 32, of the vaporization plate 4 in the foregoing fifth preferred embodiment. The heater element 51 is in the form of a sheath heater where a heater conductor is embedded at the center of a linear insulating member having a circular cross section. The heater element 51 is fixed to the foregoing side of the vaporization plate 4 in a curved or bent shape for increasing a contact area between the heater element 51 and the vaporization plate 4. The other structure is the same as that in the fifth preferred embodiment.

In the combustion heater having the foregoing structure, the fuel is supplied uniformly all over the surface of the vaporization plate 4 by the spray nozzle 32, and further is efficiently vaporized by the heater element 51 provided on the foregoing side of the vaporization plate 4. Accordingly, HC emissions due to the incomplete combustion are prevented more effectively.

In the sixth preferred embodiment, the heater element 51 may also be used for an ignition purpose and the glow plug 9 may be omitted.

Now, a seventh preferred embodiment of the present invention will be described hereinbelow.

Figure 8:
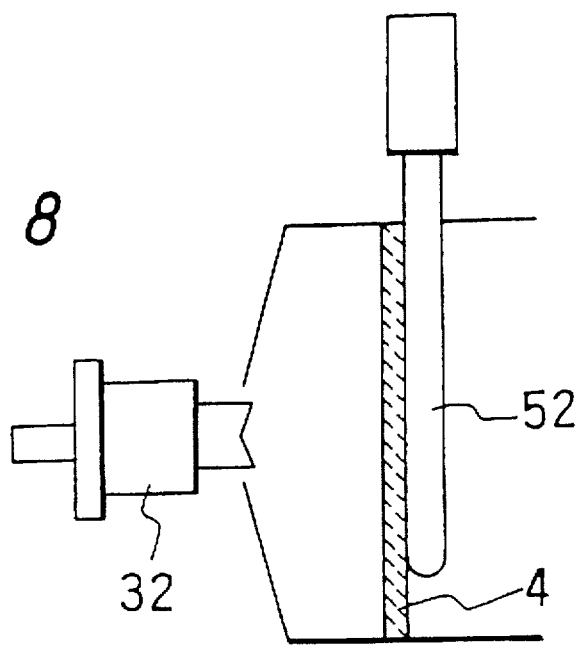
FIG. 8 is a partly-sectioned diagram for showing a state where glow plugs are mounted onto a vaporization plate, according to a seventh preferred embodiment of the present invention.
Figure 9:
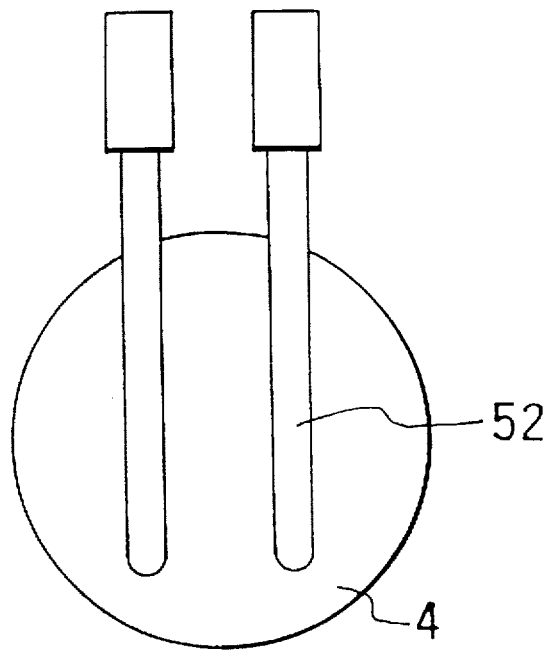
FIG. 9 is a diagram seen from one side of the vaporization plate remote from a spray nozzle for showing the foregoing state of FIG. 8.

As shown in FIGS. 8 and 9, in this preferred embodiment, a pair of glow plugs 52 are used instead of the sheath heater 51 in the foregoing sixth preferred embodiment. The number of the glow plugs 52 may be more than two. The other structure is the same as that in the sixth preferred embodiment.

In the seventh preferred embodiment, the advantage is achieved similar to that in the foregoing sixth preferred embodiment.

Now, an eighth preferred embodiment of the present invention will be described hereinbelow.

Figure 10:
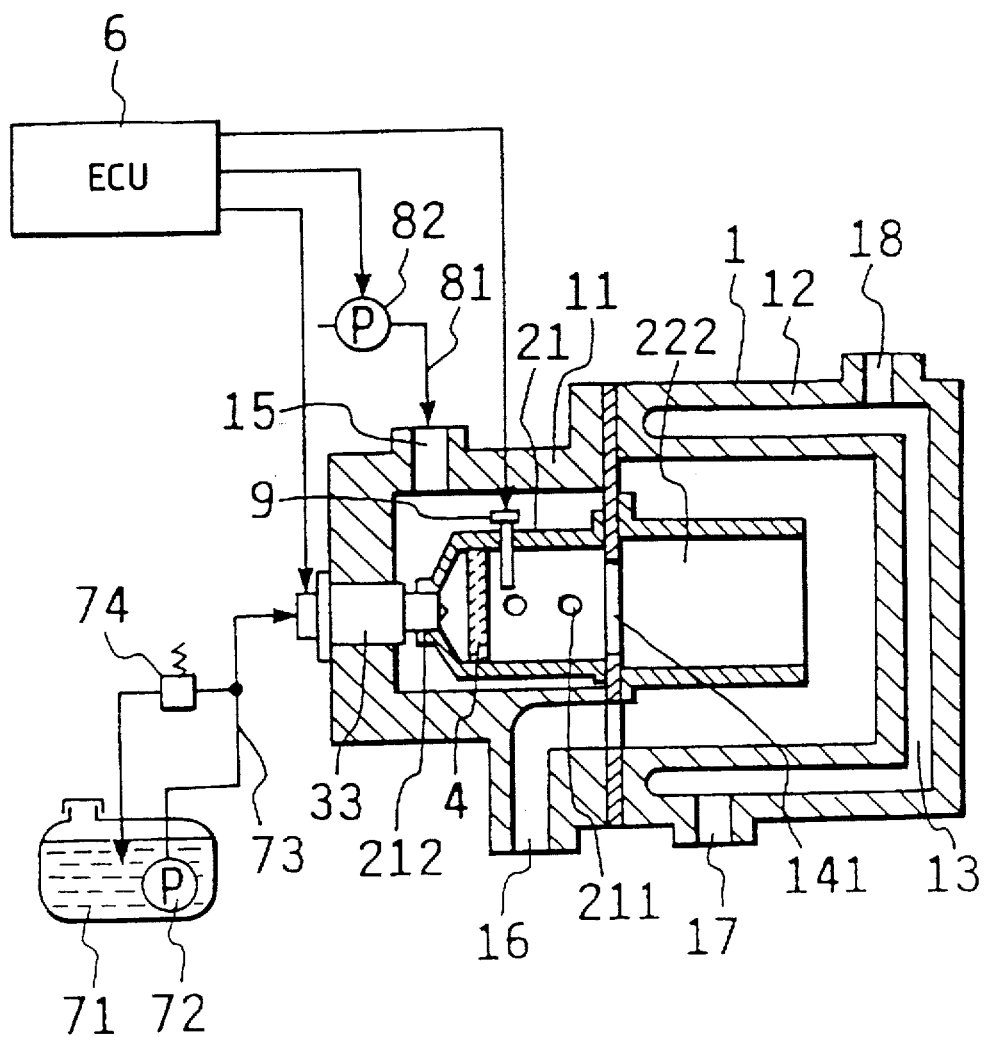
FIG. 10 is a sectional view showing the overall structure of a combustion heater according to an eighth preferred embodiment of the present invention.

FIG. 10 is a sectional view showing a combustion heater according to the eighth preferred embodiment, wherein the same or like elements are designated by the same reference numerals as those in FIGS. 3 and 5.

As shown in FIG. 10, in this preferred embodiment, a fuel injection valve 33 is used instead of the spray nozzle 32 of the fifth preferred embodiment shown in FIG. 5. The fuel injection valve 33 is arranged to confront a vaporization plate 4.

In this preferred embodiment, the foregoing advantage achieved in the fifth preferred embodiment can also be achieved.

Specifically, at the time of ignition, the fuel is injected all over the surface of the vaporization plate 4 from the fuel injection valve 33 and then vaporized. The vaporized fuel is mixed with the combustion air in the neighborhood of a heated surface of a glow plug 9 and starts to burn. Since the fuel is supplied uniformly all over the surface of the vaporization plate 4 by the fuel injection valve 33, a distribution of the fuel on the vaporization plate 4 becomes uniform. This effectively solves the problem of HC emissions caused by the incomplete combustion at the portion of the vaporization plate 4 where the fuel density is high.

Now, a ninth preferred embodiment of the present invention will be described hereinbelow.

Figure 11:
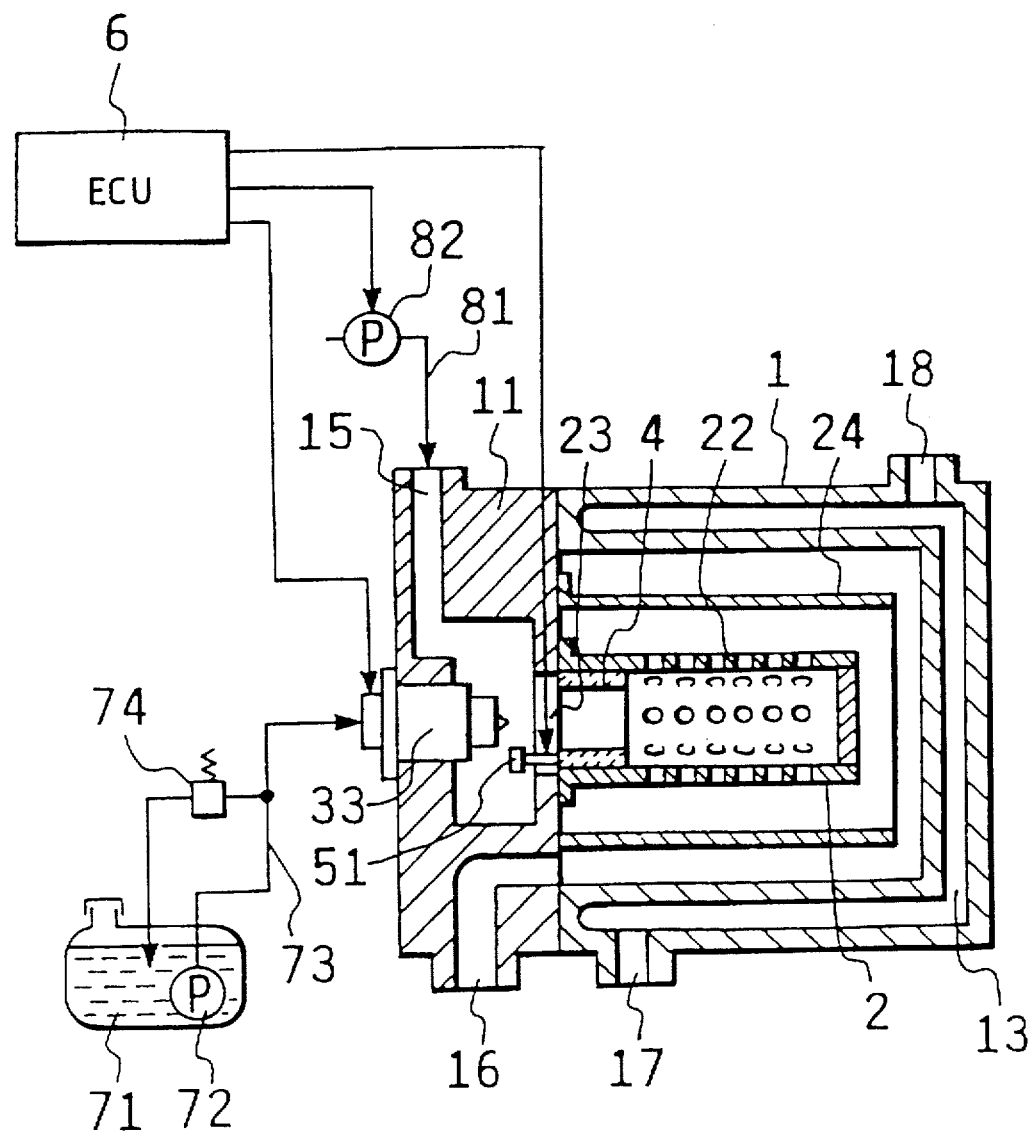
FIG. 11 is a sectional view showing the overall structure of a combustion heater according to a ninth preferred embodiment of the present invention.

FIG. 11 is a sectional view showing a combustion heater according to the ninth preferred embodiment, wherein the same or like elements are designated by the same reference numerals as those in FIG. 4.

As shown in FIG. 11, in this preferred embodiment, a tubular vaporization member 4 is provided on an inner circumferential surface of the combustion tube 22 at a side of the open end 23 thereof in the foregoing fourth preferred embodiment shown in FIG. 4. The tubular vaporization member 4 is in the form of a porous body made of, such as, foam metal.

In the combustion heater having the foregoing structure, the fuel injected from a fuel injection valve 33 is uniformly dispersed onto an inner circumferential surface of the tubular vaporization member 4. The fuel is then efficiently vaporized from the vaporization member 4 heated by a heater element 51 mounted onto the inner circumferential surface of the vaporization member 4. The heater element 51 is in the form of a sheath heater where a heater conductor is embedded at the center of a linear insulating member having a circular cross section. The heater element 51 is fixed to the inner circumferential surface of the vaporization member 4 in a curved or bent shape for increasing a contact area between the heater element 51 and the vaporization member 4, as in the foregoing sixth preferred embodiment. Accordingly, at the time of ignition, HC emissions due to the incomplete combustion can be effectively prevented. Further, at the time of extinction of flame, the problem of the evaporative emissions can be avoided.

Now, a tenth preferred embodiment of the present invention will be described hereinbelow.

Figure 12:
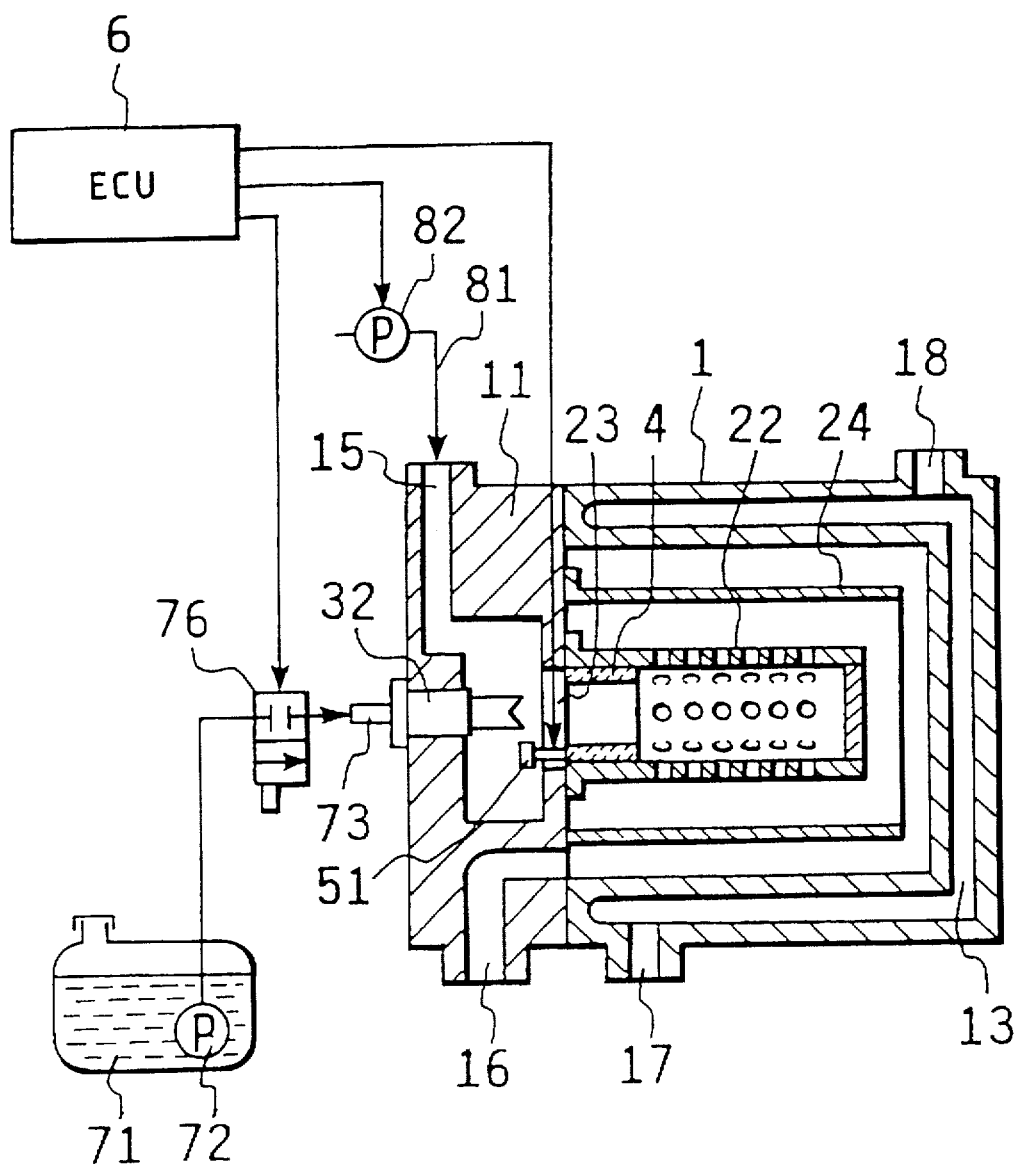
FIG. 12 is a sectional view showing the overall structure of a combustion heater according to a tenth preferred embodiment of the present invention.

FIG. 12 is a sectional view showing a combustion heater according to the tenth preferred embodiment, wherein the same or like elements are designated by the same reference numerals as those in FIG. 11.

As shown in FIG. 12, in this preferred embodiment, a spray nozzle 32 along with a fuel cutoff valve 76 which are the same as those in FIG. 5 are provided instead of the fuel injection valve 33 in the foregoing ninth preferred embodiment.

In this preferred embodiment, the foregoing advantage achieved in the ninth preferred embodiment can also be achieved.

Now, an eleventh preferred embodiment of the present invention will be described hereinbelow.

Figure 13:
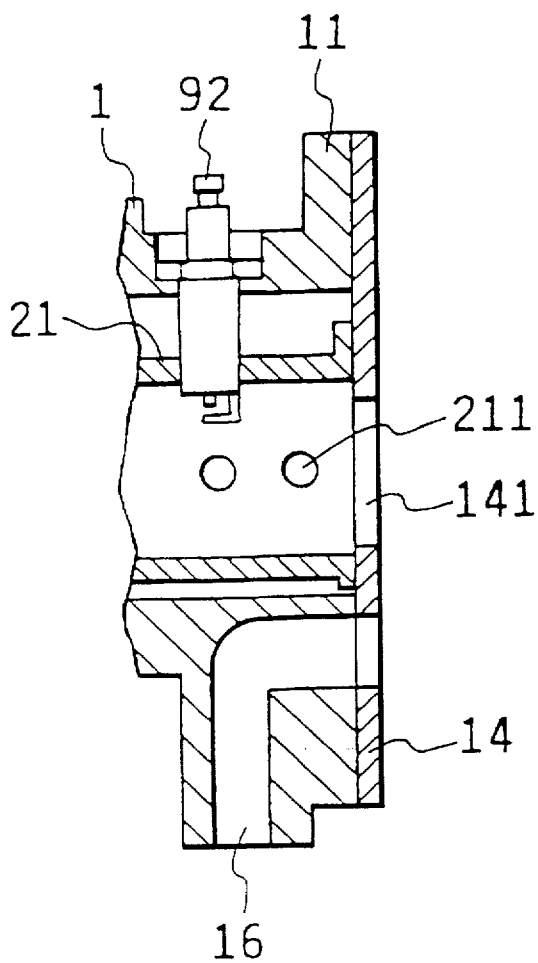
FIG. 13 is a sectional view showing a portion of a combustion heater according to an eleventh preferred embodiment of the present invention, wherein a spark plug is used instead of a glow plug in the first preferred embodiment.

As shown in FIG. 13, in this preferred embodiment, a spark plug 92 used in the automotive engine is provided at a recessed portion of the upper wall of the housing half 11 instead of the glow plug 9 in the foregoing first preferred embodiment shown in FIG. 1. The spark plug 92 is arranged to penetrate the upper wall of the housing half 11 and further the circumferential wall of the mixture tube 21 so as to expose a tip of the spark plug 92 to the interior of the mixture tube 21. The other structure is the same as that in the first preferred embodiment.

In the combustion heater having the foregoing structure, the mixture of the fuel and the combustion air is reliably ignited by means of spark discharge generated by the spark plug 92.

Now, a twelfth preferred embodiment of the present invention will be described hereinbelow.

Figure 14:
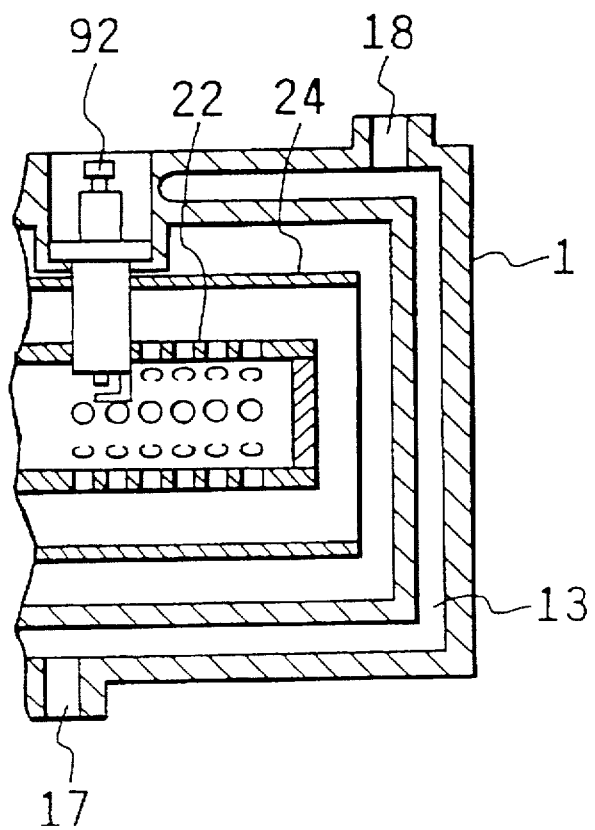
FIG. 14 is a sectional view showing a portion of a combustion heater according to a twelfth preferred embodiment of the present invention, wherein a spark plug is used instead of a glow plug in the second preferred embodiment.

As shown in FIG. 14, in this preferred embodiment, a spark plug 92 used in the automotive engine is provided at a recessed portion of the upper wall of the housing half 12 instead of the glow plug 9 in the foregoing second preferred embodiment shown in FIG. 2. The spark plug 92 is arranged to penetrate the upper wall of the housing half 12, the guide tube 24 and further the circumferential wall of the combustion tube 22 so as to expose a tip of the spark plug 92 to the interior of the combustion tube 22. The other structure is the same as that in the second preferred embodiment except that the fluid passage 13 is formed shorter for providing a space for the spark plug 92.

In this preferred embodiment, the foregoing advantage achieved in the eleventh preferred embodiment can also be achieved.

Now, a thirteenth preferred embodiment of the present invention will be described hereinbelow.

FIG. 15 is a sectional view showing a combustion heater according to the thirteenth preferred embodiment, wherein the same or like elements are designated by the same reference numerals as those in FIG. 10.

As shown in FIG. 15, in this preferred embodiment, a temperature sensor 61 is provided in a fuel feed pipe 73 upstream of and close to a fuel injection valve 33 for measuring a temperature of the fuel flowing into the fuel injection valve 33. Further, a number of fins 122 are provided on an inner circumferential surface of a housing half 12 for improving heat exchange efficiency. The fins 122 are arranged at constant intervals in a circumferential direction of the inner surface of the housing half 12. Each of the fins 122 is in the form of an elongate plate and extends axially of a housing 1.

At the time of ignition, the fuel is injected all over the surface of a vaporization plate 4 from the fuel injection valve 33 and then vaporized. The vaporized fuel is mixed with the combustion air in the neighborhood of a heated surface of a glow plug 9 and starts to burn. Since the fuel is supplied uniformly all over the surface of the vaporization plate 4 by the fuel injection valve 33, a distribution of the fuel on the vaporization plate 4 becomes uniform. This effectively solves the problem of HC emissions caused by the incomplete combustion at the portion of the vaporization plate 4 where the fuel density is high.

Figure 16:
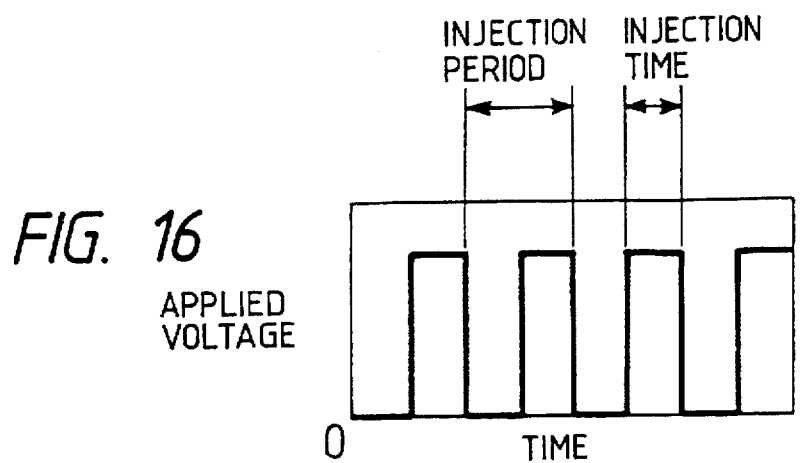
FIG. 16 is a diagram showing a time-domain variation of a voltage applied to a fuel injection valve while a fuel temperature is low.

FIG. 16 shows a time-domain variation of a voltage applied to the fuel injection valve 33 while a temperature of the fuel is low. The applied voltage to the fuel injection valve 33 is controlled by an ECU 6. The ECU 6 controls, via the applied voltage, an operation of the fuel injection valve 33, that is, an adjusting amount of the fuel injection valve 33 relative to the fuel, for adjusting a supply amount of the fuel to the burner 2. As appreciated from FIG. 16, the fuel supply to the vaporization plate 4, that is, to the burner 2 is performed in a pulsed fashion. Specifically, a constant voltage is applied to the fuel injection valve 33 for a constant time at every given period. While the voltage is applied, the fuel injection valve 33 is opened to inject a constant amount of the fuel.

On the other hand, when the fuel temperature increases, the viscosity of the fuel is lowered. As a result, even when the fuel injection valve 33 is opened for the same time period, an amount of the fuel injected for that time period is increased to enrich the mixture of the fuel and the combustion air. This causes the incomplete combustion to deteriorate the emissions in the exhaust gas.

Figure 17:
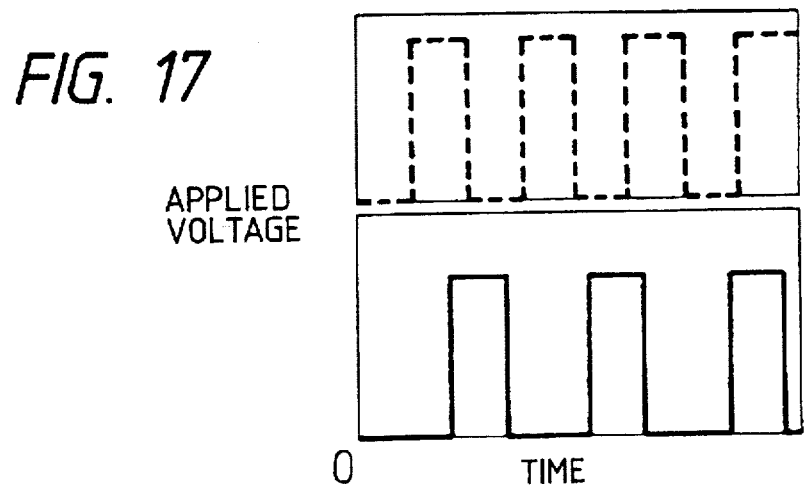
FIG. 17 is a time-domain diagram for explaining control of the applied voltage when the fuel temperature is increased, according to the thirteenth preferred embodiment.

Accordingly, in this preferred embodiment, when the fuel temperature monitored through an output of the temperature sensor 61 exceeds a given value, the ECU 6 prolongs the fuel injection period with the fuel injection time being unchanged, as shown in FIG. 17, that is, from a broken line to a solid line in FIG. 17. With this arrangement, the fuel supply amount to the vaporization plate 4 per unit time is not increased, but is kept constant.

As appreciated from the foregoing description, by controlling the fuel injection period of the fuel injection valve 33 depending on the output of the temperature sensor 61 monitoring the fuel temperature, the fuel amount supplied to the vaporization plate 4 can be held constant regardless of the fuel temperature so that a stoichiometric air-fuel ratio is maintained to prevent deterioration of the emissions in the exhaust gas.

Now, a fourteenth preferred embodiment of the present invention will be described hereinbelow.

Figure 18:
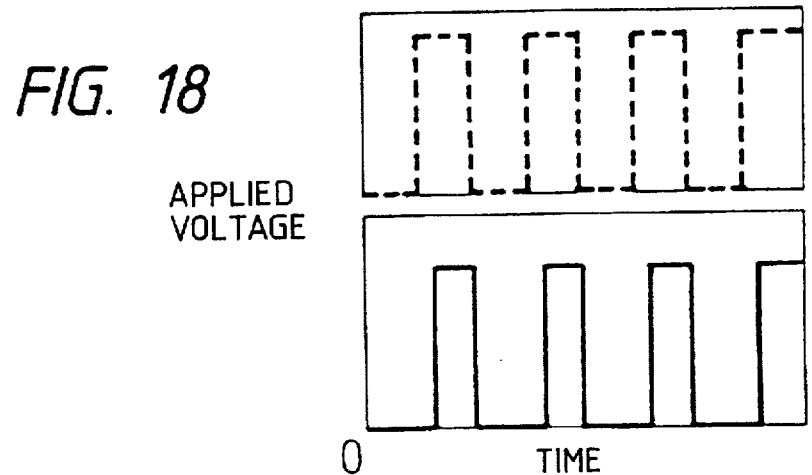
FIG. 18 is a time-domain diagram for explaining control of the applied voltage when the fuel temperature is increased, according to a fourteenth preferred embodiment of the present invention.

In this preferred embodiment, the fuel injection time is controlled depending on the monitored fuel temperature, while the fuel injection period is kept constant. Accordingly, when the fuel temperature is increased, the fuel injection time is decreased from a broken line to a solid line as shown in FIG. 18. The other structure is the same as that in the thirteenth preferred embodiment.

As appreciated, the foregoing advantage achieved in the thirteenth preferred embodiment can also be achieved in this preferred embodiment.

Now, a fifteenth preferred embodiment of the present Invention will be described hereinbelow.

Figure 19:
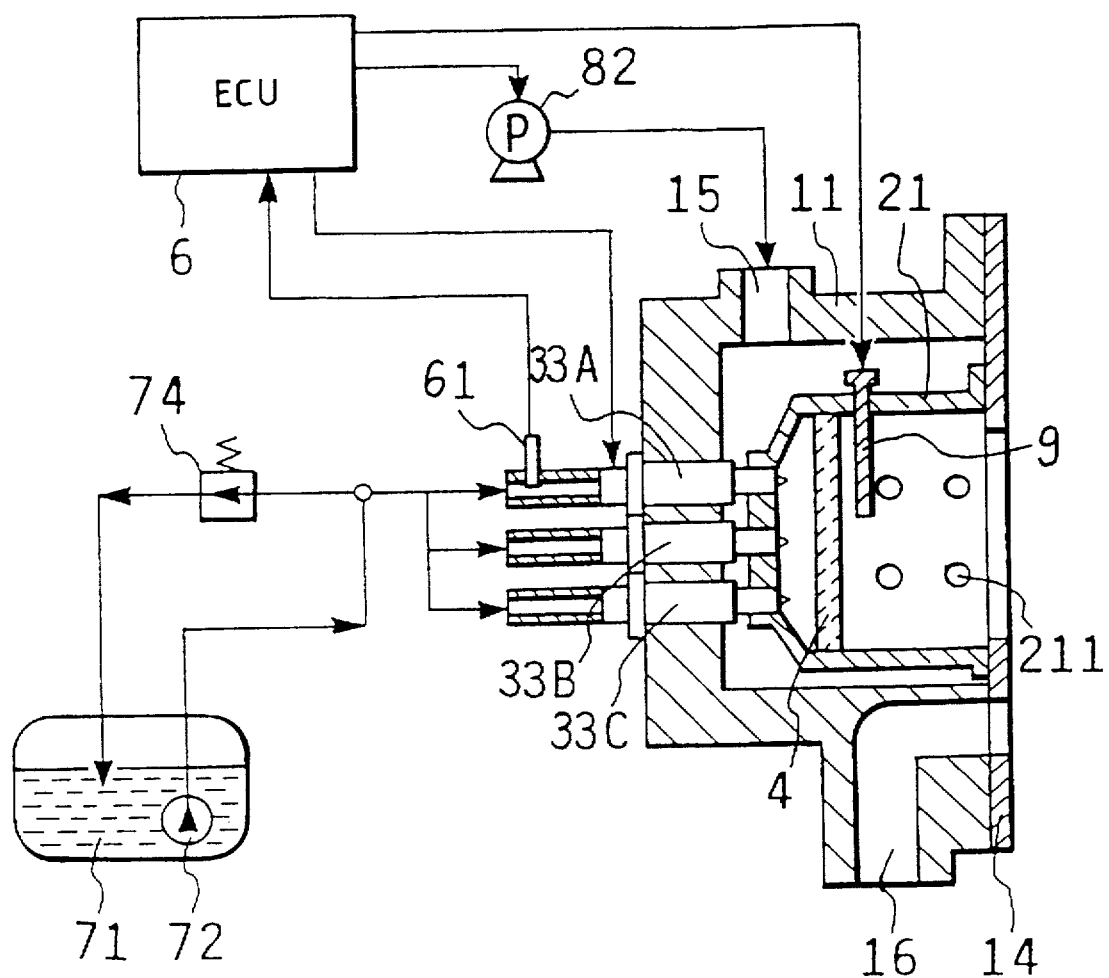
FIG. 19 is a sectional view showing a main portion of a combustion heater according to a fifteenth preferred embodiment of the present invention.

FIG. 19 is a sectional view showing a main portion of a combustion heater according to the fifteenth preferred embodiment, wherein the same or like elements are designated by the same reference numerals as those in FIG. 15. The other structure not shown in FIG. 19 is the same as that in FIG. 15.

Figure 20:
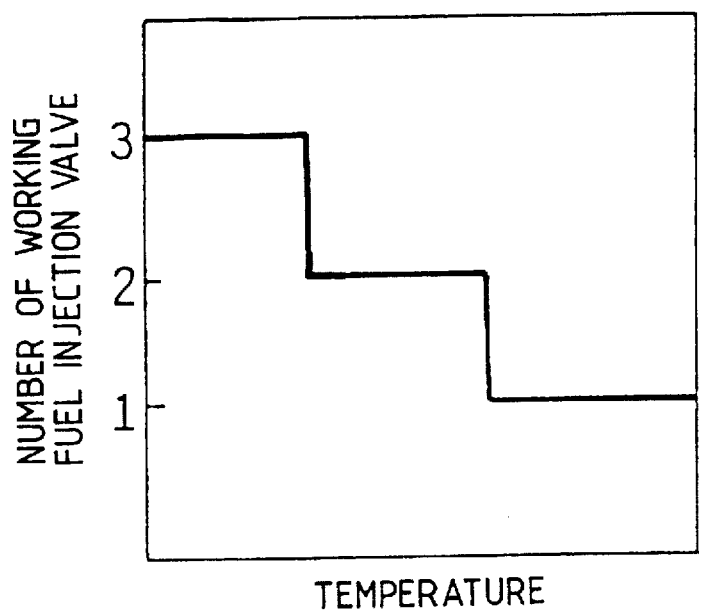
FIG. 20 is a diagram showing a variation of the working fuel injection valve number in terms of a fuel temperature according to the fifteenth preferred embodiment.

As shown in FIG. 19, in this preferred embodiment, three fuel injection valves 33A, 33B and 33C are provided instead of the fuel injection valve 33 shown in FIG. 15. The number of the fuel injection valves is not limited to three. As shown in FIG. 20, the ECU 6 reduces the number of the working fuel injection valve as the fuel temperature increases, while the fuel injection period and time are kept constant.

As appreciated, the foregoing advantage achieved in the thirteenth or fourteenth preferred embodiment can also be achieved in this preferred embodiment.

Now, a sixteenth preferred embodiment of the present invention will be described hereinbelow.

Figure 21:
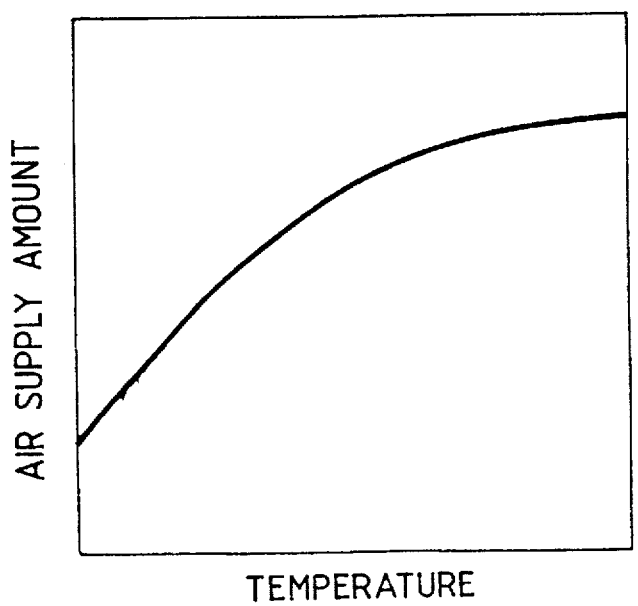
FIG. 21 is a diagram showing a variation of an air supply amount in terms of a fuel temperature according to a sixteenth preferred embodiment of the present invention.

In this preferred embodiment, the ECU 6 controls an operation of the air pump 82, that is, an adjusting amount of the air pump 82 relative to the air, for adjusting a supply amount of the combustion air to the mixture tube 21 depending on the monitored fuel temperature, while the fuel injection period and time are held constant. Accordingly, as shown in FIG. 21, when the fuel temperature is increased to make the fuel supply amount larger, the air supply amount is increased correspondingly. The other structure is the same as that in the foregoing thirteenth preferred embodiment shown in FIG. 15.

As appreciated, the foregoing advantage achieved in the thirteenth, fourteenth or fifteenth preferred embodiment can also be achieved in this preferred embodiment.

Now, a seventeenth preferred embodiment of the present invention will be described hereinbelow.

Figure 22:
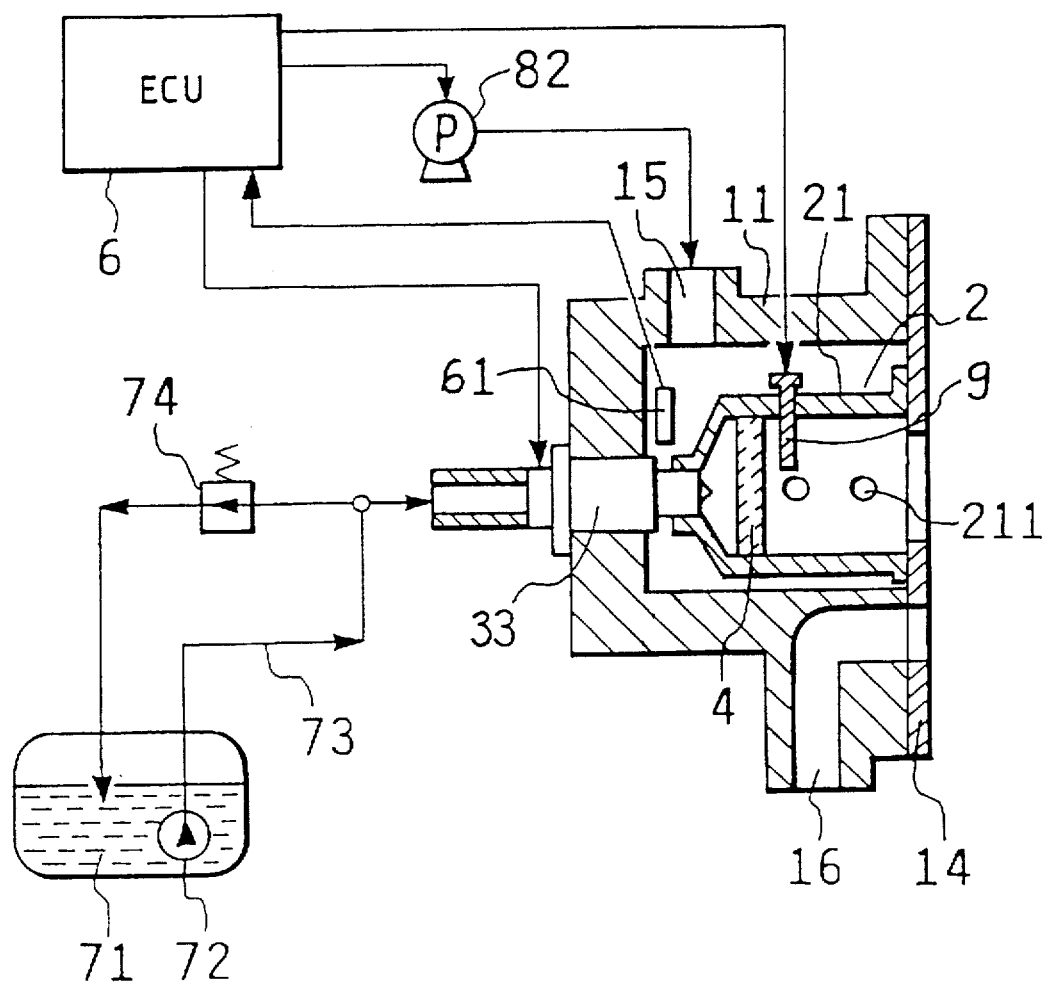
FIG. 22 is a sectional view showing a main portion of a combustion heater according to a seventeenth preferred embodiment of the present invention.

FIG. 22 is a sectional view showing a main portion of a combustion heater according to the seventeenth preferred embodiment, wherein the same or like elements are designated by the same reference numerals as those in FIG. 15. The other structure not shown in FIG. 22 is the same as that in FIG. 15.

As shown in FIG. 22, in this preferred embodiment, a temperature sensor 61 is provided in the neighborhood of a fuel injection valve 33 and in a housing half 11. Accordingly, instead of directly measuring the fuel temperature, the temperature sensor 61 monitors an ambient air temperature having a good temperature relationship to the fuel temperature.

In this preferred embodiment, the fuel injection period, the fuel injection time or the air supply amount may be controlled as in the foregoing thirteenth, fourteenth or sixteenth preferred embodiment. Alternatively, it may be arranged that a plurality of the fuel injection valves are provided as in the foregoing fifteenth preferred embodiment, that the temperature sensor 61 is provided in the neighborhood of the fuel injection valves and in the housing half 11, and that the operation of the fuel injection valves is controlled as in the foregoing fifteenth preferred embodiment. As appreciated, the advantage achieved in the foregoing corresponding preferred embodiment can also be achieved in this preferred embodiment.

Now, an eighteenth preferred embodiment of the present invention will be described hereinbelow.

Figure 23:
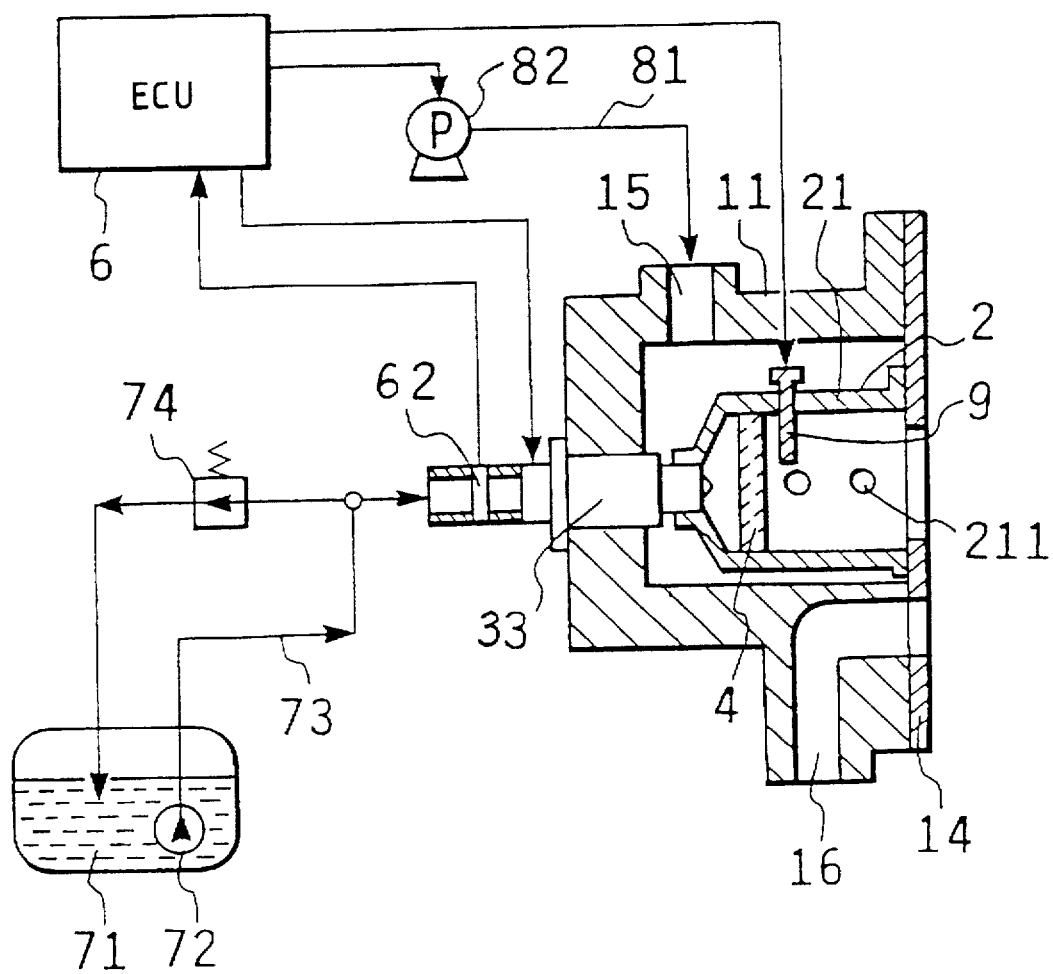
FIG. 23 is a sectional view showing a main portion of a combustion heater according to an eighteenth preferred embodiment of the present invention.

FIG. 23 is a sectional view showing a main portion of a combustion heater according to the eighteenth preferred embodiment, wherein the same or like elements are designated by the same reference numerals as those in FIG. 15. The other structure not shown in FIG. 23 is the same as that in FIG. 15.

As shown in FIG. 23, in this preferred embodiment, a flow sensor 62 is provided in a fuel feed pipe 73 instead of the temperature sensor 61 shown in FIG. 15, for directly monitoring a variation of the fuel flow. A supply amount of the combustion air to a mixture tube 21 is controlled depending on the monitored fuel flow.

As appreciated, this preferred embodiment is also effective as in the foregoing thirteenth to seventeenth preferred embodiments.

Now, a nineteenth preferred embodiment of the present invention will be described hereinbelow.

Figure 24:
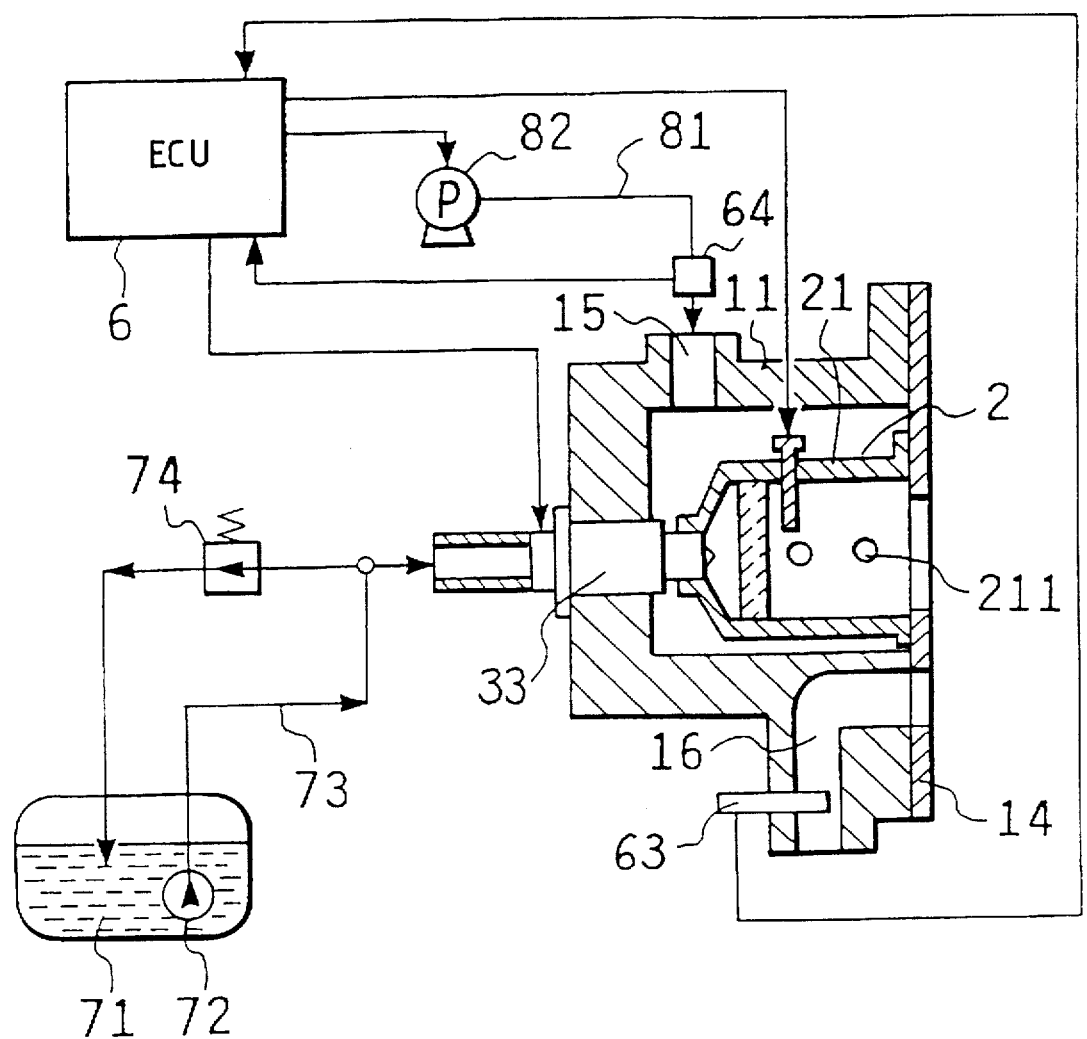
FIG. 24 is a sectional view showing a main portion of a combustion heater according to a nineteenth preferred embodiment of the present invention.

FIG. 24 is a sectional view showing a main portion of a combustion heater according to the nineteenth preferred embodiment, wherein the same or like elements are designated by the same reference numerals as those in FIG. 15. The other structure not shown in FIG. 24 is the same as that in FIG. 15.

As shown in FIG. 24, in this preferred embodiment, an air amount sensor 64 is provided in an air feed pipe 81 for monitoring an air supply amount to a mixture tube 21, and an oxygen concentration sensor 63 is provided in an exhaust-gas outlet 16 for monitoring an oxygen concentration in the exhaust gas after combustion in the burner 2. A deviation of an actual air-fuel ratio from a target air-fuel ratio is monitored based on outputs from these sensors, and a supply amount of the fuel or the combustion air is controlled based on the monitored deviation.

As appreciated, this preferred embodiment is also effective as in the foregoing thirteenth to eighteenth preferred embodiments.

Figure 25:
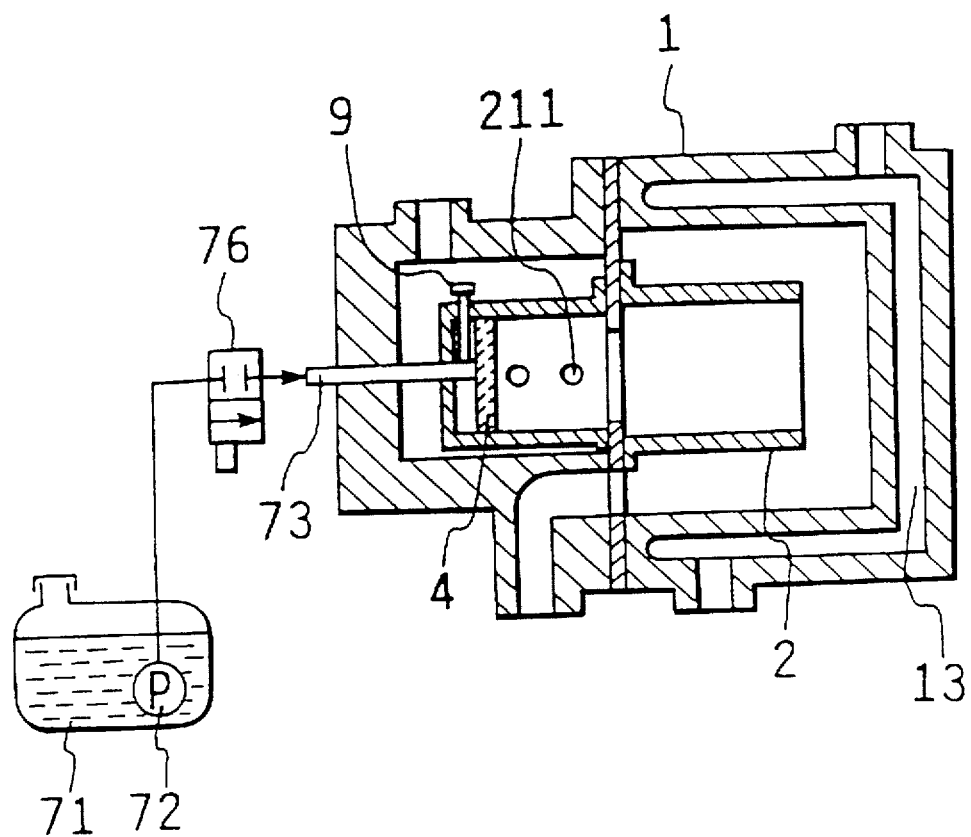
FIG. 25 is a sectional view showing the overall structure of a conventional combustion heater.

In any of the foregoing thirteenth to nineteenth preferred embodiments, the fuel injection valve/valves may be replaced by either of the other fuel feed means employed in the foregoing preferred embodiments and the prior art shown in FIG. 25.

It is to be understood that this invention is not to be limited to the preferred embodiments and modifications described above, and that various changes and modifications may be made without departing from the spirit and scope of the invention as defined in the appended claims.

What is claimed is:

1. A combustion heater having a burner in a housing provided with a fluid passage for heating a fluid introduced in said fluid passage, said combustion heater comprising:

a vaporization member provided in said burner for vaporizing a fuel supplied to said burner;

fuel feed means for supplying the fuel uniformly essentially all over the surface of said vaporization member;

air feed means for supplying combustion air to said burner; and ignition means for igniting the supplied fuel in said burner, wherein said fuel feed means includes fuel adjusting means for adjusting a supply amount of the fuel to said burner, wherein temperature detecting means is further provided for detecting a temperature of the fuel supplied to said burner, and wherein adjusting amount setting means is further provided for variably setting an adjusting amount of said fuel adjusting means based on the detected fuel temperature.

2. A combustion heater having a burner in a housing provided with a fluid passage for heating a fluid introduced in said fluid passage, said combustion heater comprising:

temperature detecting means for detecting a temperature of a fuel supplied to said burner;

fuel adjusting means for adjusting an amount of the fuel supplied to said burner;

air feed means for supplying combustion air to said burner; and adjusting amount setting means for variably setting an adjusting amount of said fuel adjusting means based on the detected fuel temperature.

3. The combustion heater as set forth in claim 2, wherein said temperature detecting means directly detects the temperature of the fuel.

4. The combustion heater as set forth in claim 1, wherein said adjusting amount setting means sets the adjusting amount of said fuel adjusting means so as to hold constant the supply amount of the fuel to said burner while the fuel temperature detected by said temperature detecting means is above a given value.

5. The combustion heater as set forth in claim 2, wherein said adjusting amount setting means sets the adjusting amount of said fuel adjusting means so as to hold constant the amount of the fuel supplied to said burner while the fuel temperature detected by said temperature detecting means is above a given value.

* * * * *